United States Patent
Kimura

(10) Patent No.: US 6,851,849 B2
(45) Date of Patent: Feb. 8, 2005

(54) METHOD AND APPARATUS FOR TEMPERATURE MEASUREMENT, AND THERMAL INFRARED IMAGE SENSOR

(75) Inventor: Mitsuteru Kimura, Miyagi (JP)

(73) Assignee: Japan Science and Technology Agency, Saitama (JP)

( * ) Notice: Subject to any disclaimer, the term of this patent is extended or adjusted under 35 U.S.C. 154(b) by 115 days.

(21) Appl. No.: 10/169,083

(22) PCT Filed: Jan. 11, 2001

(86) PCT No.: PCT/JP01/00080

§ 371 (c)(1),
(2), (4) Date: Sep. 6, 2002

(87) PCT Pub. No.: WO01/51902

PCT Pub. Date: Jul. 19, 2001

(65) Prior Publication Data

US 2003/0038332 A1 Feb. 27, 2003

(30) Foreign Application Priority Data

Jan. 12, 2000 (JP) .......................... 2000-003124
Sep. 22, 2000 (JP) .......................... 2000-288612

(51) Int. Cl.$^7$ .......................... G01K 7/00; H01L 35/00
(52) U.S. Cl. .......................... 374/163; 327/513
(58) Field of Search .......................... 324/431, 71.5, 324/224, 760, 670, 685, 721; 374/163, 171; 327/512, 513; 219/501

(56) References Cited

U.S. PATENT DOCUMENTS 3,719,797 A * 3/1973 Andrews et al. ............ 219/501

FOREIGN PATENT DOCUMENTS

| EP | 95400143.4 | 1/1995 |
|---|---|---|
| JP | 05-040064 | 2/1993 |
| JP | 09-036356 | 2/1997 |
| JP | 11-287713 | 10/1999 |

OTHER PUBLICATIONS

Kimurua, Mitsuteru, et al., "Schottky Barrier Thermistor," Technical Digest of the 11th Sensor Symposium, 1992, pp. 107–110.

* cited by examiner

*Primary Examiner*—Anjan Deb
*Assistant Examiner*—Donald M. Lair
(74) *Attorney, Agent, or Firm*—Neifeld IP Law, PC

(57) ABSTRACT

At least one forward-biased semiconductor diode having a potential barrier is used as a temperature sensor whose sensitivity can be finely adjusted. An operational amplifier circuit (A1) is used to apply a bias voltage of DC or rectangular waveform to a semiconductor diode (D) having a potential barrier used as a temperature sensor. In view of the fact that the temperature sensitivity of the semiconductor diode (D) depends on the height of its potential barrier, the forward bias voltage applied from a bias circuit (2) directly to the semiconductor diode (D) is finely adjusted to obtain desired temperature sensitivity. The output voltage of the sensor is associated with a current, having an exponential temperature dependence, which flows in the semiconductor diode (D) with the forward bias being fixed.

17 Claims, 9 Drawing Sheets

METHOD AND APPARATUS FOR TEMPERATURE MEASUREMENT, AND THERMAL INFRARED IMAGE SENSOR

FIELD OF THE INVENTION

The invention relates to a temperature measurement device with a semiconductor diode, a thermal infrared image sensor, and a method of measuring temperature. For example, the invention is used for detecting a temperature distribution in an integrated circuit, and used as a flow sensor, a Pirani gage, a thermal infrared sensor, a thermal infrared thermometer, thermal infrared image sensor, and the like.

DESCRIPTION OF THE RELATED ART

A temperature sensor, in which the p-n junction of semiconductors is utilized, has been developed heretofore. This temperature sensor, which utilizes the temperature dependence of forward build-up voltage of a p-n junction diode, namely the fact that a forward bias voltage Vf in flowing a constant current is proportional to the temperature (absolute temperature) T, is referred to as a diode temperature sensor. In addition, a bipolar transistor has a p-n junction between the emitter and base likewise, so that there is a temperature sensor referred to as a transistor temperature sensor, which utilizes the fact that a forward emitter-base voltage Ve is approximately proportional to a temperature T when a collector current is constant.

In addition, the inventor has invented a Schottky-junction temperature sensor (Japanese Patent Application No. Hei 3-284266/1991) to show that a Schottky-barrier diode can be employed as a thermistor because the temperature dependence of reverse current exactly resembles the temperature dependence of a thermistor when the reverse bias of the Schottky-barrier diode is specified and that it has the feature that the barrier height of a Schottky-barrier diode corresponds to the B constant of the equivalent thermistor, and the barrier height of a Schottky-barrier diode can be substantially fixed by determining the kind of semiconductor and the kind of Schottky metal, whereby the B constant can be decided by manufacturing a Schottky-barrier diode (For example, Schottky Barrier Thermistor; 11th Sensor Symp. 1992), and has referred to and proposed it as a Schottky-barrier thermistor.

In addition, the inventor has utilized the fact that the temperature dependence of collector current with respect to a constant collector voltage in a bipolar transistor just agrees with the temperature dependence of a thermistor when the bipolar transistor is regarded as a thermistor, has found that the B constant of the thermistor can be adjusted to a desired B constant by adjusting a forward emitter-base voltage Ve to adjust a potential barrier height between the emitter and base because the B constant of the thermistor corresponds to a potential barrier height between the emitter and base of the bipolar transistor, has proposed that it is possible to regulate the equivalent B constant of a bipolar transistor finely, and to apply a large voltage thereto for a large output, as a transistor-thermistor, and further this is applicable to a MOSFET, and has applied for a patent of "Temperature Measurement Device, Thermal Infrared Image Sensor, and Method of Measuring Temperature" (Japanese Patent Application No. Hei 11-022863/1999, hereinafter referred to as a previous invention).

SUMMARY OF THE INVENTION

However, a conventional diode temperature sensor and transistor temperature sensor each utilized the temperature dependence of a p-n junction forward bias voltage Vf and a forward emitter-base voltage Ve in a state of flowing a constant current and had the advantage that the outputs were proportional to absolute temperatures T, while the forward build-up voltages themselves were about 0.65 V at the most, for example, when silicon semiconductor were used, so that output voltages of the temperature sensors themselves, which were the changes in the forward bias voltage Vf or Ve due to temperature variations, were extremely small, and resulting in relatively low sensitivities.

In addition, also in a reverse-biased Schottky-barrier thermistor, a B constant subtly differed depending on the difference in the manufacturing temperature of the Schottky-barrier diode, the difference in reverse-leakage current, and the difference in reverse-applied operating voltage actually, even when the kind of semiconductor and the kind of Schottky metal were determined; and the specification of a voltage to be applied to the Schottky-barrier thermistor, which is a Schottky-barrier diode, prevented the application of a large voltage, so that the output became small, the reverse resistance became large for such output, and thus the SN became relatively small.

Further in the case of a common thermistor, when a failed thermistor is replaced with another new thermistor, a thermistor having a B constant close to that of old one, which determines the temperature sensitivity, has been selected and connected in series or in parallel with a resistor to make it approach the old thermistor; however both are essentially different even when connecting a resistor having little temperature dependence to a thermistor having the exponential temperature dependence of the resistance value, so that the compatibility of conventional thermistors has been required and a temperature sensor having an adjustable temperature sensitivity has been desired.

In addition, a transistor-thermistor, which is sensitive but a three-terminal element, has a location where a transistor-thermistor used as an infrared-receiving portion and a temperature sensor portion especially in applications to thermal infrared sensors or thermal infrared image sensors is formed. The location takes on an air-suspended thin film structure having cavities above and below for thermally separating itself from the substrate, and needs at least three wirings, and the areas of their electrodes occupy a large percentage of the location relative to a minute radiation-receiving area, so that it has been desired to make it a two-terminal transistor-thermistor, if possible. Further, it has been impossible to apply a large collector voltage because of heat liberation resulting from the collector dissipation of a transistor in applications to thermal infrared sensors or thermal infrared image sensors.

In addition, a p-n junction diode has a small forward resistance, so that the insertion of a resistor in series with the p-n junction diode for measuring current variations with respect to temperatures may cause a voltage drop at the resistor and lead to a change in bias voltage applied to the p-n junction diode under a constant external supply voltage. In addition, it was difficult to obtain a desired temperature sensitivity because reducing a voltage drop at the output resistor inserted in series reduced an output voltage correspondingly.

Further, with a forward voltage of a p-n junction diode, a subtle fluctuation in forward voltage leads to a large current variation due to an exponential increase in diode current with respect to an applied voltage, so that this current fluctuation can be misidentified to be a change in measured temperature and the accuracy of temperature tends to become rough with an usual stabilized power supply. Therefore, when a p-n junction diode is used as a temperature sensor, the above-described easily-controllable diode temperature sensors of current control type, rather than a voltage control type as the invention, have been used so far.

In consideration of the foregoing, the invention has as its object to provide a diode temperature sensor, especially a temperature sensor with a large SN ratio, high sensitivity, and high accuracy by utilizing the volt-ampere characteristic of a semiconductor diode which has an exponential temperature dependence in a case where a forward bias voltage is fixed in the two-terminal semiconductor diode. The invention has as its object to provide a high-accuracy temperature measurement device with the sluggish temperature dependence by using a p-n junction diode which contains enough impurities, for example, to degenerate both the p-side and the n-side, and has a tunneling current decreased to a level that it becomes negligible compared to a diffusion current, for example, by increasing the diffusion time of impurities to broaden the width of a depletion layer. In addition, the invention has as its object to provide a temperature measurement device in which the temperature sensitivity can be regulated by regulating a fixed forward bias voltage. In addition, the invention has as its object to provide various devices utilizing the temperature measurement device. Further, the invention has as its object to provide a temperature measurement device with high accuracy and a high sensitivity and its method by using a bias voltage supply circuit, which permits a forward voltage to be regulated finely and stably, to apply a finely-regulated bias voltage to the semiconductor diode directly.

According to a first solving means of the invention, it is provided a temperature measurement device comprising:

a bias voltage supply circuit for outputting an output voltage between a first and second outputs;

a semiconductor diode applied at one end with the first output of said bias circuit as a forward bias voltage;

an operational amplifier circuit having a first input connected to the other end of said semiconductor diode, a second input supplied with the second output of said bias voltage supply circuit, and an output for temperature measurement, wherein a potential barrier height of said semiconductor diode is adjusted by adjusting the output voltage of said bias voltage supply circuit to adjust the forward bias voltage of said semiconductor diode, whereby the temperature measurement device can be adjusted to have a desired temperature sensitivity.

According to a second solving means of the invention, it is provided a thermal infrared image sensor, wherein more than one said semiconductor diode and said bias voltage supply circuit in the temperature measurement device, as described above, are arrayed in a matrix, and output signals relating to temperatures according to received infrared radiation from individual said semiconductor diodes are read out.

According to a third solving means of the invention, it is provided a method of measuring temperature utilizing the temperature dependency of a volt-ampere characteristic of a semiconductor diode having at least one potential barrier for governing a current, comprising:

connecting a bias voltage supply circuit, a semiconductor diode, and an input side of an operational amplifier circuit in series;

reducing an output voltage of said bias voltage supply circuit enough to ignore a voltage drop on the way to apply it as a forward bias voltage directly to said semiconductor diode; and making an output of said operational amplifier circuit affect a forward current flowing through said semiconductor diode, wherein adjustment in order to have a desired temperature sensitivity is made possible by: adjusting the output voltage of said bias voltage supply circuit; thereby changing the forward bias voltage of said semiconductor diode; and adjusting potential barrier height.

Figure 1:
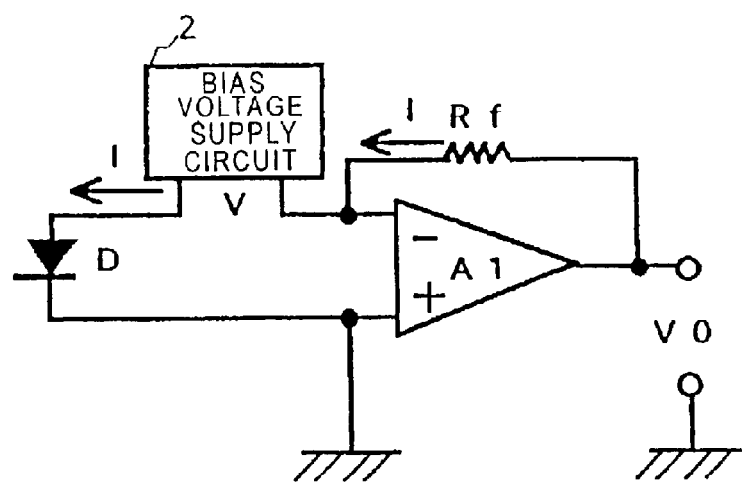
FIG. 1 is a block diagram of a first embodiment of a semiconductor diode temperature measurement device according to the invention.

DESCRIPTION OF THE PREFERRED EMBODIMENT (1) Principle of Operation and General Outline A semiconductor diode temperature measurement device according to the invention utilizes the temperature dependence of the volt-ampere characteristic of a semiconductor diode having at least one potential barrier for governing current and comprises a bias voltage supply circuit, a semiconductor diode used as a temperature sensing portion (temperature sensor), and an operational amplifier circuit. In the temperature measurement device, an output voltage of the bias voltage supply circuit can be applied as a forward bias voltage directly to the semiconductor diode through the operational amplifier circuit without any voltage drops on the way; and the operational amplifier circuit is so constructed that the output of the operational amplifier circuit can influence a forward current flowing through the semiconductor diode used as a temperature sensor. The temperature measurement device is so arranged that it can be adjusted to have a desired temperature sensitivity by adjusting an output voltage of the above-described bias voltage supply circuit to adjust a forward bias voltage of this semiconductor diode and to adjust its potential barrier height.

Also in a transistor-thermistor of the previous invention, the temperature sensitivity is determined by the height of a p-n junction diode potential barrier between the emitter and base, and of carriers in the emitter, the carriers having crossed over this barrier go into the collector without any recombination substantially to turn into collector currents. Because of this, emitter current is equal to collector current substantially, and so what has utilized the fact that a collector resistance can be treated as a thermistor resistance with respect to a constant collector voltage has been the transistor-thermistor. On the other hand, a semiconductor diode temperature measurement device of the invention, in which a semiconductor diode having at least one potential barrier for governing current is used, has a temperature sensitivity for a temperature sensor (corresponding to a ratio of a forward current to the reciprocal of temperature T, here) which can be adjusted by applying a forward bias voltage from the outside to adjust a potential barrier height of the semiconductor diode. In addition, it is understood that a combination of the semiconductor diode and an operational amplifier circuit permits a forward bias voltage, which is an output of the bias voltage supply circuit, to be applied directly to the semiconductor diode used as a temperature sensor, and permits the construction where this forward current varying depending on a temperature flows directly through a feedback resistor of the operational amplifier circuit, whereby this feedback resistance can act as, so to speak, the collector resistance of a transistor-thermistor of the previous invention. Considering in this way, a semiconductor diode temperature measurement device of the invention is equivalent to a transistor-thermistor of the previous invention, however, the invention offers the advantages: that a portion for radiating heat as the collector dissipation is utilized as a feedback resistor of the operational amplifier circuit and thus the portion is not located in a temperature sensor portion in the invention; that a high-sensitivity two-terminal temperature sensor can be achieved instead of the three-terminal transistor-thermistor; and that a portion of heat liberation can be mounted outside.

Taking an example of a p-n junction diode as a semiconductor diode having at least one potential barrier, a forward current I of a p-n junction diode can be substantially expressed as an approximate expression by the following equation when qV is more than about four times kT, where V is an applied voltage and T is a temperature.

$$I = qA(n_n De/Le + p_p Dh/Lh) \exp\{-q(Vd-V)/nkT\}$$

Where, $n_n$ and $p_p$ are substantial densities of n-type and p-type majority carriers, i.e. the respective impurities, De and Dh are diffusion coefficients of electrons and holes respectively, and Le and Lh are diffusion lengths of electrons and holes respectively; and these are determined by the determination of temperatures after the formation of the p-n junction diode, and may be considered to be constant values substantially because of their small temperature dependence if not at an extremely low temperature. Vd is a diffusion potential of p-n junction, has the temperature dependence which becomes sluggish when a semiconductor impurity density is increased, and may be considered to be a constant value substantially regardless of temperatures when the p-n junction diode is manufactured to contain many impurities (to have high impurity densities (concentrations)) enough to degenerate both the p-side and the n-side. That is, in a p-n junction diode, a high impurity concentration reduces the temperature dependence of Fermi level of a semiconductor. Therefore, to manufacture a temperature measurement device with high accuracy, it is necessary to increase impurities enough to degenerate both the p-side and the n-side. Further to refrain from being a tunnel diode, it is desirable that a sluggish impurity distribution is produced in the p-n junction portion, for example, by increasing a diffusion time of impurities during the formation of p-n junction to widen a depletion layer. The q, k, and n are an elementary electric charge, the Boltzmann constant, and an ideal coefficient, respectively. The ideal coefficient n is 1 in the case of a p-n junction diode with good single crystal characteristics, while n is a constant determined at the time of manufacture, for example, in a range of the order of 1.1 to 1.7 when departing from an ideal p-n junction diode by using a polycrystalline semiconductor. A is a p-n junction area. In addition, q(Vd−V) is a potential barrier height of p-n junction, is the only factor, which is variable even after fabrication, in a forward current I of p-n junction diode, while it is also a factor exponentially contributing to I with a temperature T and a portion for showing a temperature sensitivity S of current I.

Taking the natural logarithm of forward current I of the p-n junction diode, then $$\log_e I = -S/T + C$$

$$S = q(Vd-V)/nk$$

$$C = qA(n_n De/Le + p_p Dh/Lh),$$

where C is substantially a constant value, so that the logarithm of forward current I ($\log_e$ I) and the reciprocal of temperature (1/T) are in proportional relationship and the constant of proportion is the temperature sensitivity S of forward current I.

Then, it is understood that this temperature sensitivity S is proportional to the potential barrier height q(Vd−V) of the p-n junction and can be adjusted by a forward bias voltage V of the p-n junction diode. Because the diffusion potential Vd of a silicon (Si) p-n junction diode is about 1.0 V, the p-n junction diode operates with a forward bias voltage V smaller than it in a temperature measurement device of the invention.

In a temperature measurement device of the invention, the upper limit of measurable temperatures is determined by an energy gap Eg of semiconductor employed for the semiconductor diode primarily, so that a semiconductor having a larger energy gap Eg can operate up to a higher temperature correspondingly. For example, while silicon is considered to have an upper limit of 150° C., use of silicon carbide (SiC) permits the measurement of a temperature equal to or higher than 700° C.

In a semiconductor diode temperature measurement device according to the invention, an output voltage of the bias voltage supply circuit can be set to a predetermined forward bias voltage in a generally-rectangular single waveform or a repeated waveforms train and an output from the operational amplifier circuit can be taken out in synchronization with a applied forward bias voltage. In this case, to enable the fine adjustment of this voltage, for example, the bias voltage supply circuit may be provided with a rectangular wave generator circuit or a well-known waveform shaping circuit may be used to form a single rectangular wave, and a voltage actually applied to the semiconductor diode may be set into a generally-rectangular single waveform or a repeated waveforms train, for example, by interrupting or switching an output of the stabilized DC power supply for a finely-adjusted forward bias voltage using an analog switch or the like with a MOSFET or the like. In this case, because a current flowing through the operational amplifier circuit has a generally-rectangular current waveform, it is necessary to take out as an output a current only when a generally-rectangular current waveform is not at zero but at a constant current value (depending on a temperature of the semiconductor diode), so that the output of that portion is taken out with a timing in synchronization with the time of flowing a constant current other than zero. The applied forward bias voltages thus applied intermittently in time and in the form of pulses can suppress the self heat generation of the semiconductor diode, and the SN ratio can be improved by taking out an output signal in synchronization with the applied forward bias voltage, so that it is possible to realize a temperature measurement device with high accuracy. Note that the representation, generally-rectangular, in the above description represents that it is difficult to make waveforms clear rectangle because waveforms become blunt due to a resistance, capacitance, inductance, and the like, for example, even when rectangular waves are input.

In addition, in a semiconductor diode temperature measurement device according to the invention, a semiconductor diode having at least one potential barrier for governing current as a temperature sensor may consist of a suitable diode, such as a Schottky junction diode, p-n junction diode, $n^+$-n junction diode or $p^+$-p junction diode, which has different concentration n-type semiconductors or p-type semiconductors bonded to each other, or heterojunction diode. The Schottky junction diode is easy to manufacture and can be employed for a semiconductor with a large band gap such as SiC, in which it is difficult to form a p-n junction. In addition, $n^+$-n junction diode and $p^+$-p junction diode can be utilized at a low temperature. The currents of these semiconductor diodes each have exponential characteristics with respect to a temperature and the potential barrier height as with the above-described p-n junction diode, because the temperature sensitivities S can be expressed by $S=q(Vd-V)/nk$. There is a case where the use as a Schottky junction diode is more advantageous, such as the case of a semiconductor material which is difficult to bond a p-type and n-type ones to form a p-n junction, or the case where a semiconductor diode is formed in a semiconductor thin film having cavities above and below to reduce both the thermal capacity and the thermal conductance. Also $n^+$-n junction or $p^+$-p junction diodes of the same conductivity type semiconductors, even with no p-n junction, has the potential barrier for governing current inside and can utilize thermal carriers which cross over the this barrier, so that it can be utilized as a temperature sensor. Generally in the case of a high temperature, a $n^+$-n junction or $p^+$-p junction between the same conductivity type semiconductors has no rectification and leads to an ohmic contact. However, at a low temperature, namely when the potential barriers of these junctions are in the same level of the temperature energy kT or more, those diodes exhibit the rectification, and thus this potential barrier governs the current of these semiconductor diodes. As a matter of course, a heterojunction diode has also a potential barrier formed therein, so that it can be utilized as a temperature sensor of the invention.

Further, in a semiconductor diode temperature measurement device according to the invention, a semiconductor diode can be formed in an air-suspended thin film having cavities above and below (a thin film structure). In this case, the semiconductor diode used as a temperature sensor can be thermally separated because of a clearance between the diode and a substrate, and can be formed into a film besides to thereby reduce the thermal capacity and thermal conductance extremely, so that it is also useful in manufacturing a thermal infrared sensor or thermal infrared image sensor.

Further, in a semiconductor diode temperature measurement device according to the invention, a plurality of semiconductor diodes are formed in a substrate and the forward bias voltages to be applied to them respectively can be adjusted by the output adjustment of the bias voltage supply circuit, whereby their respective temperature sensitivities can be equal or approximately equal to one another.

This temperature measurement device is used, for example, in a case where two air-suspended thin films having cavities above and below each have a semiconductor diode formed therein when manufacturing a thermal infrared sensor, and one semiconductor diode is used as a temperature sensor for actually receiving infrared radiation to be measured and the other is optically shielded and used as a temperature sensor for compensating temperatures. As a matter of course, this temperature measurement device is also useful when a temperature sensor of a thin film structure is formed into a matrix to manufacture a thermal infrared image sensor.

In addition, in a semiconductor diode temperature measurement device according to the invention, at least two or more of semiconductor diodes may be formed in a substrate, and an operational circuit can be constructed so that differential outputs of current signals of those semiconductor diodes can be obtained. This case is preferable for measurements of fine temperature variation such as temperature measurements with a thermal infrared clinical thermometer or the like. Further, in the semiconductor diode temperature measurement device according to the invention, of the two or more of semiconductor diodes formed in a substrate, at least one may be formed in a film having a cavity below, and at least another one may be formed directly in the substrate to enable the measurement of substrate temperatures. This case is especially useful because a temperature difference with respect to a substrate can be detected also in cases where it is used for a thermal infrared sensor, a thermal flow sensor, or the like.

In a semiconductor diode temperature measurement device according to the invention, to facilitate forming a semiconductor diode as a temperature sensor on an insulator or a thin film structure, polycrystalline semiconductor may be used to form the semiconductor diode.

In addition, a semiconductor diode temperature measurement device according to the invention may be so arranged that, for example, a desired temperature measurement range can be easily obtained by preparing a bias voltage supply circuit comprising a voltage division resistor previously set up to offer a forward bias voltage which can be finely adjusted to permit the semiconductor diode to have a desired temperature sensitivity. Further, the semiconductor diode temperature measurement device according to the invention may be so arranged that one constant voltage power supply circuit in the bias voltage supply circuit can be used to apply forward bias voltages to a plurality of semiconductor diodes respectively. This is a case where only one constant voltage power supply circuit is good enough, otherwise a constant voltage power supply circuit would be provided for each of many semiconductor diodes, whereby the device would become costly and large in size. Further, in the semiconductor diode temperature measurement device according to the invention, at least part of the constant voltage power supply circuit in the bias voltage supply circuit may be integrated in the same substrate as one or more said semiconductor diodes. For example, a Zener diode for generating a reference voltage of the constant voltage power supply circuit in the bias voltage supply circuit and a peripheral circuit may be integrated in a substrate to divide a constant voltage of this Zener diode with a voltage division resistor, whereby to apply a desired forward bias voltage to the semiconductor diode. However, a voltage division resistance in this case must be enough small compared to a resistance of the semiconductor diode at the forward bias voltage to ignore a voltage drop in this voltage division resistor and to directly apply a forward bias voltage to the semiconductor diode.

Further, in a semiconductor diode temperature measurement device according to the invention, currents from a plurality of semiconductor diodes arranged to be applied with desired forward bias voltages respectively may be flowed into a single operational amplifier circuit sequentially. This is a case where one operational amplifier circuit suffices instead of providing an operational amplifier circuit for each individual semiconductor diode, whereby with respect to vast numbers of semiconductor diodes as a thermal infrared image sensor, for example, one operational amplifier circuit can suffice.

Further, a thermal infrared image sensor according to the invention comprises a plurality of semiconductor diodes arrayed and formed in a matrix, each of which is a temperature sensor formed in a thin film having cavities above and below, and acts as an infrared sensor, in which output signals from the individual semiconductor diodes in connection with temperatures according to received infrared radiation are read out. In this case, thermal infrared sensor arrays are individually arranged on X-Y plane (on horizontal-vertical plane) in a matrix, an optical system is arranged to focus an image on the sensor arrays through an infrared lens or concave mirror, and each of thermal infrared sensors is used as a picture element of an image (which constructs one pixel). It is better to individually divide a forward bias voltage V from a stabilized power supply and apply the forward bias voltage to each of the semiconductor diodes, for example, to make them each have a desired temperature sensitivity. Thus, an infrared image can be displayed like televisions.

In addition, a thermal infrared image sensor according to the invention comprises a circuit so arranged that one operational amplifier circuit can suffice with respect to many semiconductor diodes arrayed and formed in a plurality of matrices, and that each of the semiconductor diodes is applied with a forward bias voltage sequentially only while that semiconductor diode is selected and a current from the semiconductor diode flows into the operational amplifier circuit, in combination with an analog switch or the like.

Further, a method of measuring temperature according to the invention is a temperature measurement method, in which the above-described semiconductor diode temperature measurement device is used to adjust a forward bias voltage of a semiconductor diode to make the semiconductor diode have a desired temperature sensitivity. Also, in a method of measuring temperature according to the invention, a predetermined forward bias voltage is of a generally-rectangular single waveform or of a repeated waveforms train, and an output from the operational amplifier circuit can be taken out in synchronization with a applied forward bias voltage. It is intended to reduce power consumption in a semiconductor diode, which is a temperature sensor, and to improve a SN by synchronization.

(2) Semiconductor Diode Temperature Measurement Device

The embodiments of a semiconductor diode temperature measurement device according to the invention and the application device thereof will be described in detail hereinafter with reference to the drawings.

FIG. 1 is a block diagram of a first embodiment of a semiconductor diode temperature measurement device according to the invention. The variable temperature sensitivity can be achieved by applying a forward bias voltage V, which is an output voltage from the bias voltage supply circuit 2, to the semiconductor diode D as a temperature sensor to regulate the forward bias voltage V. In this example, there is nothing other than the bias voltage supply circuit 2 between the operational amplifier A1 and the semiconductor diode D to directly apply a forward bias voltage V, which is an output voltage from the bias voltage supply circuit 2, to the semiconductor diode D through the operational amplifier A1, and the non-inverting input terminal of the operational amplifier A1 is grounded directly. Because the current I flowing through the semiconductor diode D flows through the feedback resistor Rf as it is, the output voltage V0 of the operational amplifier A1 is as follows: V0=I*Rf, and thus the output voltage V0 becomes proportional to a current I depending on a temperature T exponentially because of a constant feedback resistance Rf. For example, in a case where a silicon p-n junction diode is used as a semiconductor diode D, when the applied forward bias voltage V is increased up to 0.7V as 0.3, 0.4, 0.5, and 0.6 at a room temperature T=300K, the diode current I increases exponentially, and in terms of a temperature sensor the potential barrier of p-n junction becomes smaller and the temperature sensitivity S becomes smaller, that is the current variation with respect to a temperature variation becomes insensitive. Further, when the forward bias voltage V is fixed at 0.5V for example, the current is exponentially reduced with respect to the temperature T at a low temperature and the current is exponentially increased at a high temperature, while the temperature sensitivity S is still constant. The output voltage V0 of the operational amplifier A1 is expressed by the product of the diode current I having the temperature dependence and feedback resistance Rf, so that it has the exponential characteristics with respect to the temperature T due to the diode current I flowing through the feedback resistor Rf. If I=100 $\mu$A at a certain temperature when the feedback resistor Rf is 1 k$\Omega$ (ohm), then the output voltage is V0=0.1V. Note that even at a low temperature, for example, at T=100K, it is possible to perform temperature measurements at such a low temperature by applying a forward bias voltage V to nearly the build-up voltage of the volt-ampere characteristic of the semiconductor diode D at that temperature to the semiconductor diode. While at a high temperature, the thermally excited carriers having passed through the semiconductor band gap Eg can be measured within a sufficiently small range compared to the thermally excited carriers crossing over the potential barrier, it is better to bring the diode into operation with a forward bias voltage V as small as possible because the diode current I becomes too large and besides the temperature sensitivity S becomes small when increasing the forward bias voltage V.

For example, when a p-n junction diode or Schottky junction diode of silicon carbide (SiC) is used, it can be used even at a high temperature up to T=about 1000K because the band gap Eg of SiC is about 3 eV. In addition, it can operate at a low temperature by applying a forward bias voltage V of about 2.5V, so that it become possible to perform temperature measurements at a low temperature to a high temperature by regulating the forward bias voltage V of the same silicon carbide (SiC) p-n junction diode or Schottky junction diode.

If for a manufactured semiconductor diode D, currents I with respect to at least two temperatures T and at least two forward bias voltages V are measured and the calibration is performed, the above-described ideal coefficient n and diffusion potential difference Vd can be found out to find out the temperature sensitivity S with respect to a certain applied forward bias voltage V.

Figure 2:
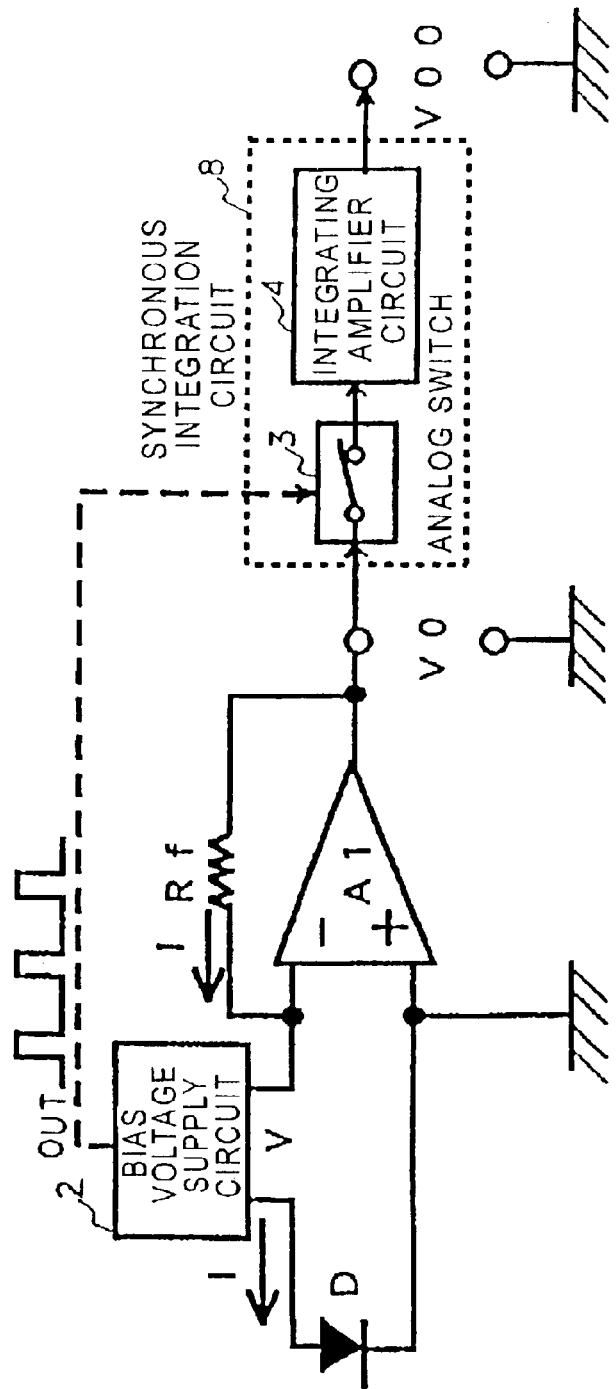
FIG. 2 is a block diagram of a second embodiment of a semiconductor diode temperature measurement device according to the invention.

FIG. 2 is a block diagram of a second embodiment of a semiconductor diode temperature measurement device according to the invention.

FIG. 2 shows a circuit block diagram in a case where a synchronous integration circuit 8 is added to the configuration of FIG. 1, when a applied forward bias voltage of rectangular or generally-rectangular voltage waveform is further applied thereto as an output voltage from the bias voltage supply circuit 2 instead of a direct current applied forward bias voltage which can be set at a desired voltage. In this synchronous integration circuit 8, for example, a rectangular wave voltage OUT in synchronization with a applied forward bias voltage from the bias voltage supply circuit 2 is applied to an analog SW (switch) 3 as shown by a broken line to switch it, and an output voltage V0 from the operational amplifier A1 goes into the integrating amplifier circuit 4 synchronously, whereby an output voltage V00 with an improved SN ratio can be obtained, as described above. Note that a peak-hold circuit may be inserted in the integrating amplifier circuit 4. In addition, the rectangular wave voltage OUT may be of not only a rectangular wave but also a suitable voltage waveform such as a santooth wave, triangular wave, and pulse wave.

Figure 3:
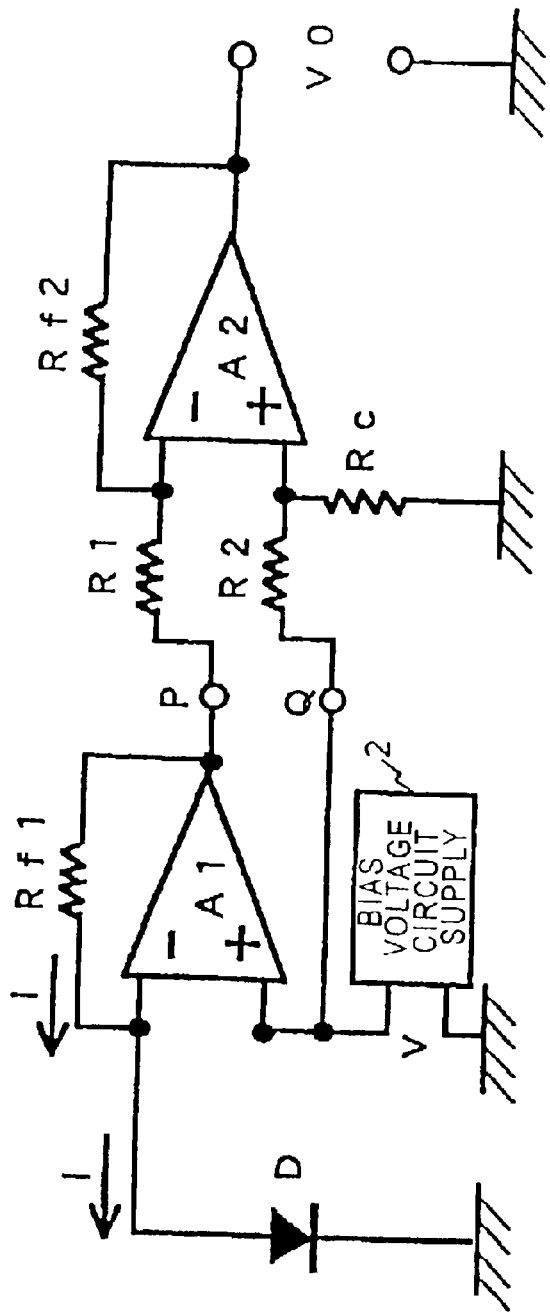
FIG. 3 is a block diagram of a third embodiment of a semiconductor diode temperature measurement device according to the invention.

FIG. 3 is a block diagram of a third embodiment of a semiconductor diode temperature measurement device according to the invention. Here, to apply a forward bias voltage V to a semiconductor diode D as a temperature sensor, an output voltage from a bias voltage supply circuit 2 is connected to a non-inverting input terminal of an operational amplifier A1, and the semiconductor diode D is directly connected between an inverting input terminal of the operational amplifier A1 and a ground, thereby enabling the direct application of the forward bias voltage V to this semiconductor diode D. In this case, with a first-stage amplifier circuit with a feedback resistor Rf1 placed across it, a component of forward bias voltage V remains in its output voltage (at a P terminal), so that to cancel this component, a forward bias voltage V, which is an output voltage of the bias voltage supply circuit 2, is used as a differential input of an operational amplifier A2, which is a second-stage differential amplifier (at a Q terminal), and the output of the first stage is amplified. In this case, if resistance values are determined so that Rf2/R1=Rc/R2=K, then a voltage K times I*Rf1, which is an output signal of the first stage (operational amplifier A1), is an output V0 of the second stage (operational amplifier A2). For example, if Rf2=Rc=10 kΩ (ohm), and R1=R2=1 kΩ (ohm), then K=10. In this case, if a power supply of forward bias voltage V and the semiconductor diode D both are connected reversely in orientation, the output voltage V0 of the second stage can reverse in sign. As a matter of course, also in this case, a temperature sensitivity for a temperature sensor S can be adjusted by adjusting an output voltage from the bias voltage supply circuit 2 to adjust the forward bias voltage V to the semiconductor diode D.

The output voltage from the bias voltage supply circuit 2 in FIG. 3 may be a direct current applied forward bias voltage which can be set at a desired voltage as in the case of FIG. 1, otherwise it may be a applied forward bias voltage of a suitable voltage waveform such as a rectangle, where the temperature measurement device further comprises a synchronous integration circuit 8 or the like as in FIG. 2.

Figure 4:
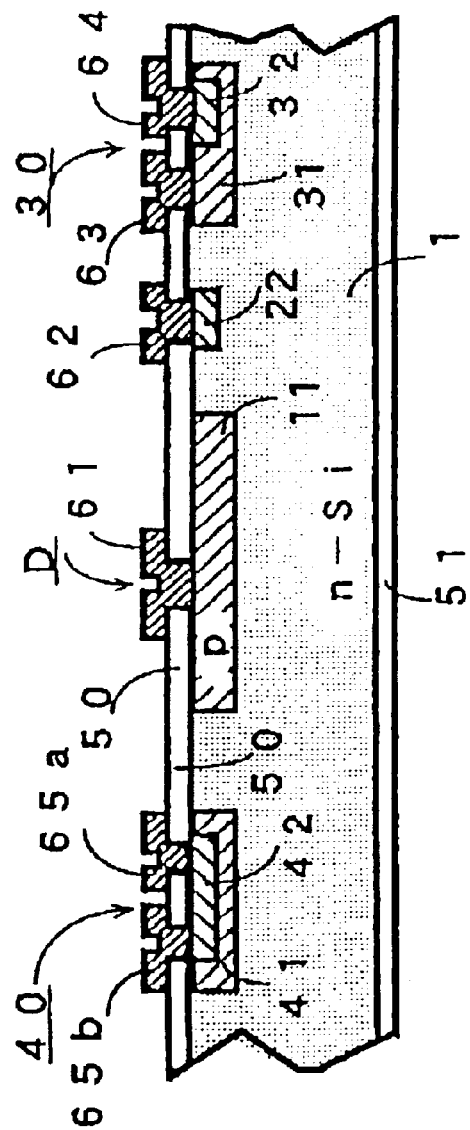
FIG. 4 is a cross sectional view of a semiconductor diode temperature measurement device of the invention (1).

FIG. 4 is a cross sectional view of a semiconductor diode temperature measurement device of the invention (1). This figure graphically represents a general outline in a case where a semiconductor diode D used as a temperature sensor, a Zener diode 30, which is used as a voltage reference of a constant voltage power supply circuit in a bias voltage supply circuit 2, and a diffused resistor 40 of a resistor circuit are integrated in an n-type silicon (Si) substrate 1. This diffused resistor 40 may be used as a voltage division resistor used for dividing a voltage from the constant voltage power supply circuit or a feedback resistor.

For example, this device can be manufactured as follows. First, a surface of n-type Si substrate 1 is oxidized by heating to grow a silicon oxide film having a thickness of about 0.5 microns 50, 51, then windows are opened in the surface of the Si substrate 1 using a well-known photolithography technique, and initially, for example, p-type impurities (e.g. boron) are doped at a depth of about 3 microns by thermal diffusion to form a p-type layer 31 of the Zener diode 30, which is a p-type impurity layer, a p-type layer 11 of the semiconductor diode D, and a p-type layer 41 for isolation of the diffused resistor 40. Next, the Si substrate 1 is further oxidized by heating, windows are opened at required locations, and in turn, for example, n-type impurities (e.g. phosphorus) are doped at a depth of about 1 micron by thermal diffusion or an ion implantation technique to form an n-type layer 32 of the Zener diode 30, which is an n-type impurity layer, an ohmic contact layer 22 for the semiconductor diode D, and an n-type diffused resistor layer 42, which is a diffused resistor. Thereafter, the substrate is oxidized by heating again, windows are opened for electrodes, and then metallization for wirings is carried out to form wirings, electrodes 65a, 65b for the diffused resistor 40, electrodes 61, 62 of the semiconductor diode D, electrodes 63, 64 of the Zener diode 30, and pads and the like. The reverse breakdown-voltage of the Zener diode 30 is substantially determined by impurity densities in both sides of the p-n junction and the higher the impurity densities are, the smaller the reverse breakdown-voltage is. Thus, when the impurity densities are high, the reverse breakdown-voltage is produced by an actual Zener effect. This is a tunnel effect, so that this breakdown-voltage can be made a reference voltage of the constant voltage power supply circuit, which is extremely stable and insensitive to temperatures (for example, it is possible to design a reverse breakdown-voltage to be 6V). A diffused resistor value depends on an impurity density of the n-type diffused resistor layer 42 and its dimension, so that it can be designed to be a desired resistance value, for example, to be 1 kΩ (ohm), which is a resistance value of the diffused resistor 40. As for electrodes, for example, it is possible to use a vacuum deposition film of Si-doped Al, which has been used as material for electrodes of semiconductor device in the past, or the like.

While not represented graphically, it is also possible to form one or more semiconductor diodes in a p-type Si substrate 1 and to form a temperature measurement device by doping impurities with conductivity types opposite to those of FIG. 4.

Figure 5:
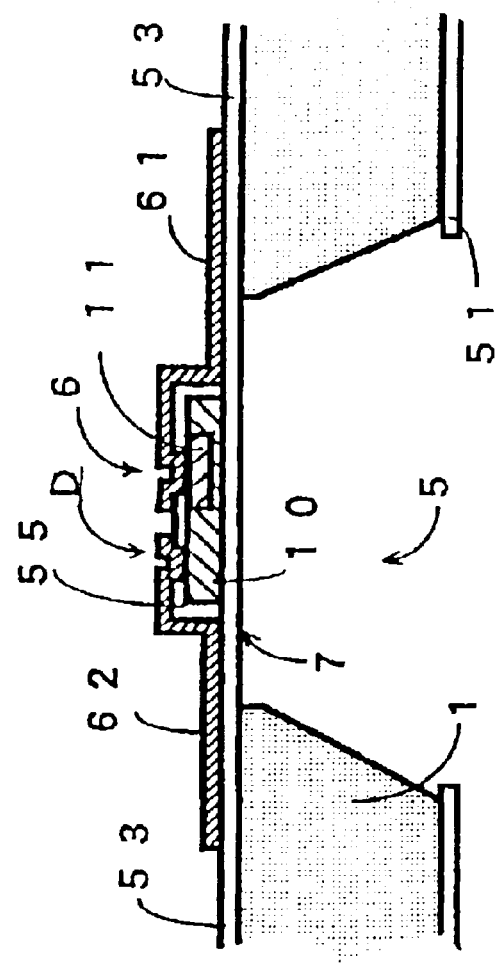
FIG. 5 is a cross sectional view of a semiconductor diode temperature measurement device of the invention (2).

FIG. 5 is a cross sectional view of a semiconductor diode temperature measurement device of the invention (2). This figure graphically represents a general outline in a case where one semiconductor diode D as a temperature sensor is formed on a thin film structure 7, which is an air-suspended thin film having cavities above and below. When a semiconductor diode D is thus formed on a thin film structure 7, a thermal capacity and thermal conductance of the semiconductor diode D can be reduced because the film has the cavities above and below, so that the case is advantageous to utilize the semiconductor diode temperature measurement device as a radiation-receiving portion of a thermal infrared sensor or as one pixel in a thermal infrared image sensor matrix. Note that with the representation, to have cavities above and below, means that the lower cavity 5 is clearly seen, the upper cavity 6 is an upper space of the thin film structure 7. When such semiconductor diode temperature measurement device is utilized, for example, as a thermal infrared sensor, the device is covered with a cap in general, whereby a space is created there. Then, this local space is referred to as an upper cavity 6.

This device can be manufactured, for example, as follows. An isolation film 53 such as an oxide film or nitride film is formed on a (100) plane of Si substrate 1, followed by forming an n-type polycrystalline Si thin film 10 or forming an n-type single crystal Si thin film 10 thereon. Using the resultant substrate (SOI substrate), the n-type Si thin film 10 is patterned with desired dimension patterns (e.g. 30 microns square) by well-known photolithography technique and micromachining techniques. Next, a p-type layer 11 is formed by thermal diffusion of p-type impurities, followed by forming and patterning an isolation thin film 55, such as a $SiO_2$ thin film, and forming electrodes 61, 62 of the semiconductor diode D (which is a p-n junction diode, in this case). Further, the cavity 5 is formed with anisotropic etching by alkali etching through the use of hydrazine, KOH solution, or the like utilizing windows of silicon oxide film 51 in a rear surface of the Si substrate 1. In this way, the air-suspended thin film structure 7 can be formed. Note that alkali etchant-resistant metal, for example, Au or Mo may be used as the electrodes 61, 62. In addition, when the device is used as an infrared radiation-receiving portion, an infrared absorbing layer may be formed in a radiation-receiving portion region. The air-suspended thin film structure 7 may be of diaphragm form in which its periphery is linked with the Si substrate 1, of both-ends-supported bridge structure form, and of one-end-supported cantilever form. Of these forms, FIG. 5 shows a case of diaphragm form or both-ends-supported bridge structure form as an example.

Figure 6:
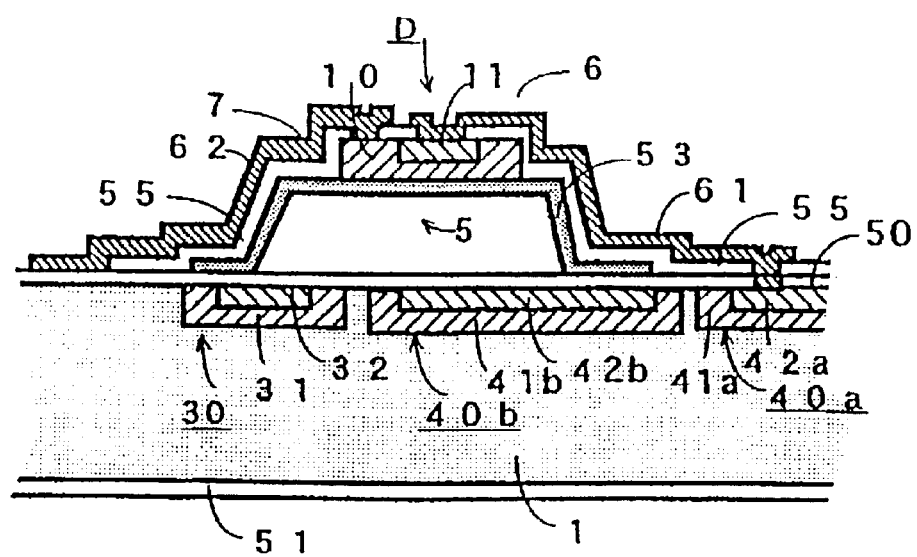
FIG. 6 is a cross sectional view of a semiconductor diode temperature measurement device of the invention (3).

FIG. 6 is a cross sectional view of a semiconductor diode temperature measurement device of the invention (3). This figure graphically represents a general outline in a case where one semiconductor diode D as a temperature sensor is formed on a thin film having cavities above and below. A Zener diode 30 used as a voltage reference of a constant voltage power supply circuit 100, and diffused resistor 40a, 40b of a resistor circuit are integrated in an n-type silicon (Si) substrate. This is an example in which a lower cavity 5 is formed on the Si substrate 1 by sacrificial layer etching, which is a well-known technique, and also the Zener diode 30 of the constant voltage power supply circuit in the bias voltage supply circuit 2, the diffused resistor 40a, 40b used as voltage division resistors and the like are integrated in the Si substrate 1 simultaneously. Note that a part having the same function as those in a case shown in FIGS. 4 and 5, and other drawings is identified by the same reference characters.

Figure 7:
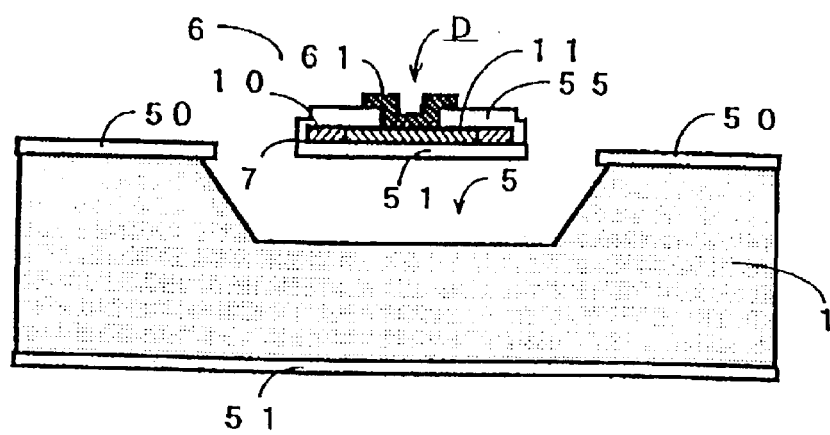
FIG. 7 is a cross sectional view of a semiconductor diode temperature measurement device of the invention (4).

FIG. 7 is a cross sectional view of a semiconductor diode temperature measurement device of the invention (4). This figure graphically represents a general outline in a case where one semiconductor diode D as a temperature sensor is formed on a thin film having cavities above and below, in which a lower cavity 5 is formed by anisotropic etching from an upper surface of a Si substrate 1. Thus etching from an upper surface of a Si substrate 1 enables the formation of a small thin film structure 7. The example here is a case where a p-type layer 11 is formed in a thin n-type single crystal Si thin film 10 of a SOI substrate by diffusing p-type impurities, wherein the p-type layer 11 reaches a silicon oxide film 50, which is a lower isolation thin film, and a p-n junction is formed in a periphery of the p-type layer 11. In addition, the example here is a case where a thin film structure 7 is of bridge structure or cantilever form, wherein electrodes from the thin n-type single crystal Si thin film 10 are not shown in this cross sectional view and they are located in the inner part thereof. As a matter of course, when the device is used as a thermal infrared sensor, it is better to form a infrared absorbing film in a radiation-receiving portion of the thin film structure 7.

Figure 8:
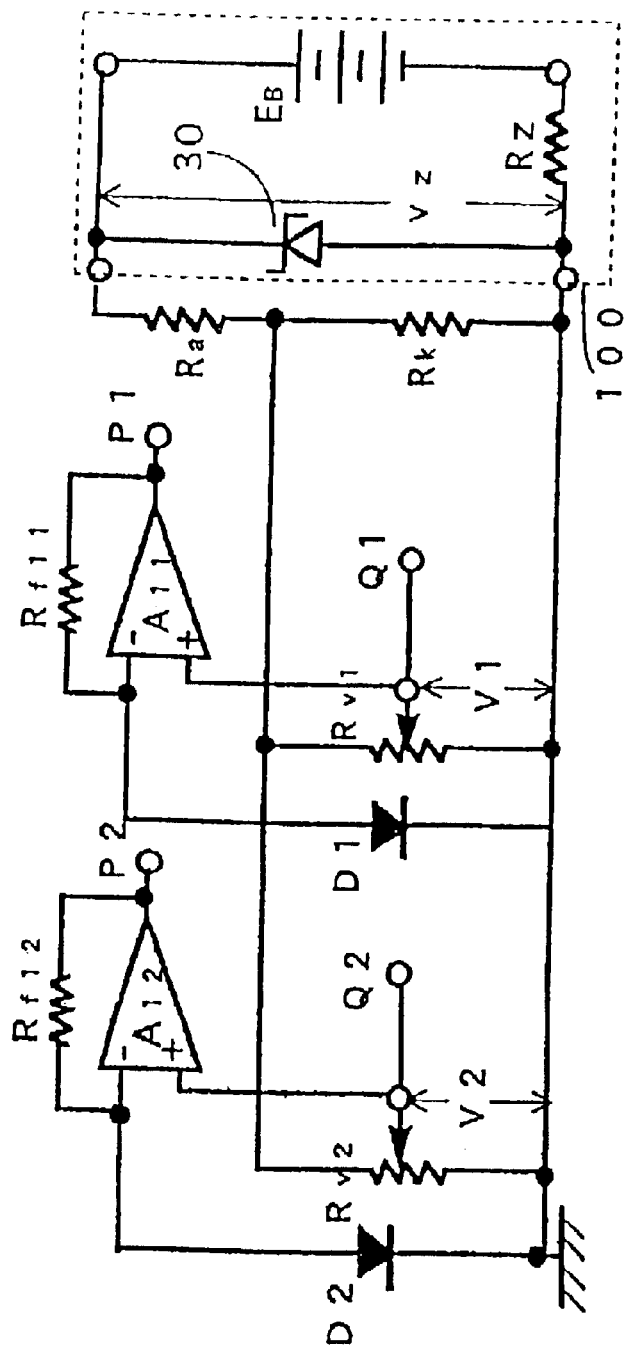
FIG. 8 is a circuit diagram of a semiconductor diode temperature measurement device having a plurality of semiconductor diodes.

(3) Temperature Measurement Device and Thermal Infrared Sensor Using a plurality of Semiconductor Diodes FIG. 8 is a circuit diagram of a semiconductor diode temperature measurement device having a plurality of semiconductor diodes. This figure graphically represents a case where two semiconductor diodes D1, D2, which are temperature sensors, can be regulated by forward bias voltages V1, V2, for example, so that they have a temperature sensitivity S. In this case, one Zener diode 30 used as a voltage reference of constant voltage power supply circuit 100 is used, a voltage from this is divided with a resistor Ra and resistor Rk, and variable resistors Rv1, Rv2 are used to the semiconductor diodes D1, D2 respectively, whereby it becomes possible to regulate fine forward bias voltages V1, V2. In the meantime, forward bias voltages V1, V2 used as output voltages of bias voltage supply circuit 2 are directly applied to the semiconductor diodes D1, D2, as they are, so that of variable resistors Rv1, Rv2, voltage division resistor parts, which produce respective forward bias voltages V1, V2, may be set to have so small resistance values that they can be ignored compared with resistances of the semiconductor diodes D1, D2 with those forward bias voltages V1, V2 applied in order to make it possible to obtain stable forward bias voltages V1, V2 with respect to large current variation of the semiconductor diodes D1, D2 caused by temperature variation. Here, the device is constructed based on the circuit diagram in FIG. 3, and so arranged that an operational amplifier circuit uses two operational amplifiers A11, A12 to which feedback resistors Rf11, Rf12 are inserted respectively, whereby amplified outputs can be obtained. Further, to make the circuit clearly understandable here, circuits corresponding to the second-stage operational amplifier circuit in the circuit diagram of FIG. 3 are omitted, and P, Q of FIG. 3 correspond to P1, Q1, and P2, Q2, for each semiconductor diodes D1, D2. For example, with respect to a Zener diode 30 having a Zener voltage Vz of 6V, 7V direct current power supply EB, and a resistor Rz connected in series with the power supply, which is set at about 100Ω (ohm) may be used to form a constant voltage power supply circuit 100.

While this embodiment is a case where two semiconductor diodes D1, D2 are used, it is possible to increase the number of diodes as in the case of this. In addition, a thermal infrared sensor may be so arranged that one of two semiconductor diodes D1, D2 is formed on an air-suspended thin film having cavities above and below (thin film structure 7) to produce outputs corresponding to an amount of received infrared radiation and the other is formed in a semiconductor substrate to detect an ambient temperature; otherwise both of two semiconductor diodes D1, D2 are formed on thin film structures individually to enable one of them to be used for receiving infrared radiation, and to shield the other from infrared radiation to be measured, and a differential amplifier is added to produce differential outputs of the two semiconductor diodes D1, D2 (e.g. differential outputs of P1 and P2) using the circuit of FIG. 7.

Further, while FIG. 8 is a case where a direct current power supply EB is used for a constant voltage power supply circuit 100, for example, a rectangular wave generator may be used to generate and apply a rectangular wave voltages train instead of this direct current power supply EB. Also, by synchronizing the outputs with this rectangular wave voltage train and adding a synchronous integration circuit 8 as shown in FIG. 2, temperature sensor outputs may be displayed with their SN ratios improved.

Figure 9:
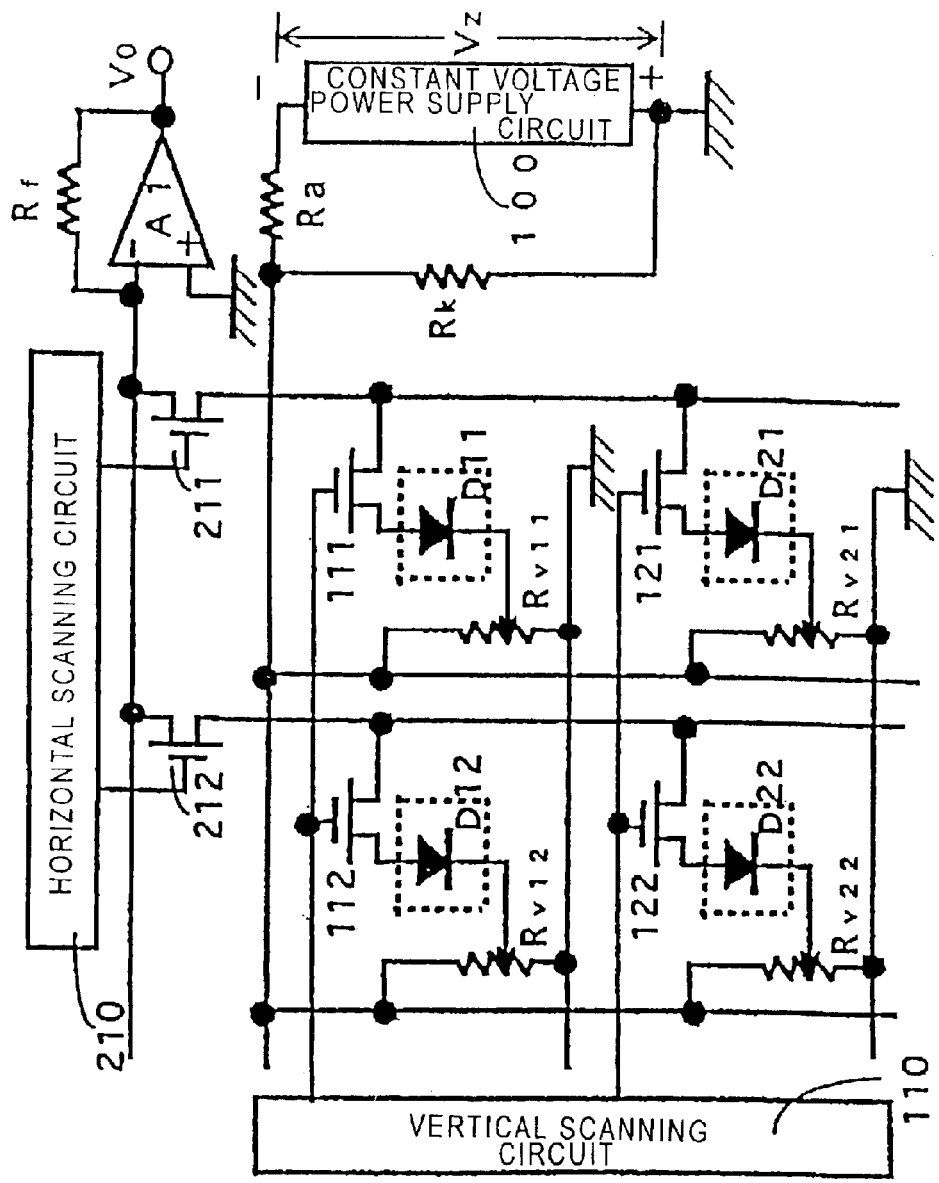
FIG. 9 is a circuit diagram in a case where a semiconductor diode temperature measurement device of the invention is applied to a thermal infrared image sensor.

FIG. 9 shows a circuit diagram in a case where a semiconductor diode temperature measurement device of the invention is applied to a thermal infrared image sensor. For example, semiconductor diodes D11, D12; D21, D22 arrayed in a matrix are formed on air-suspended thin films having cavities above and below (thin film structures) and are used as temperature sensing portions of infrared sensor to form pixels of a thermal infrared image sensor. Further, it is possible to adjust variable resistors Rv11, Rv12; Rv21, Rv22 to make the respective temperature sensitivities S, for example, identical and to apply required forward bias voltages to the respective diodes through an operational amplifier A1. As for semiconductor diodes arrayed in each matrix, a well-known vertical scanning circuit 110 and horizontal scanning circuit 210, and MOSFETs 211, 212; 111, 112; 121, 122 may be used to drive the individual semiconductor diodes D11, D12; D21, D22 sequentially. This case is based on the circuit diagram shown in FIG. 1 except for the inserted location of the bias voltage supply circuit 2, wherein a divided voltage may be obtained through resistors Ra, Rk from one constant voltage power supply circuit 100, and one common operational amplifier A1 can suffice by contriving the circuit instead of arranging the circuit to have an operational amplifier for each individual semiconductor diode.

Further, in the circuit configuration of FIG. 9, a semiconductor diode selected by the vertical scanning circuit 110, horizontal scanning circuit 210, and MOSFETs 211, 212; 111, 112; 121, 122 is applied with a voltage only while it is selected and current flowing through the selected diode flows into the single common operational amplifier A1 and is output. Therefore, each individual semiconductor diodes is applied with a forward bias voltage such as a predetermined rectangular wave voltage.

In addition, after fabricating the above-described semiconductor diodes individually, they may be arranged to enable the bias voltage supply circuit 2 to regulate their temperature sensitivities, and the built-in bias voltage supply circuit 2 may be integrated to have a desired temperature sensitivity in the fabrication to manufacture a semiconductor diode temperature measurement device. Further, because this semiconductor diode is a temperature sensor, a temperature control circuit or temperature detection circuit can be constructed by assembling the semiconductor diode and a microheater, a Peltier element, or the like. Note that the type such as n type and p type, material, thickness, and size of semiconductors, and the like can be suitably designed.

It is apparent that the above-described embodiments are each a mere embodiment of the invention, and many changes may be made therein even with the same purport, effects and advantages of the invention.

Industrial Applicability

As described above, the invention can provide a diode temperature sensor, especially a temperature sensor with a large SN ratio, high sensitivity, and high accuracy by utilizing the volt-ampere characteristic of a semiconductor diode which has an exponential temperature dependence in a case where a forward bias voltage is fixed in the two-terminal semiconductor diode. According to the invention, it is possible to provide a high-accuracy temperature measurement device with the sluggish temperature dependence by using a p-n junction diode which contains enough impurities, for example, to degenerate both the p-side and the n-side. In addition, according to the invention, it is possible to provide a temperature measurement device in which the temperature sensitivity can be regulated by regulating a fixed forward bias voltage. In addition, according to the invention, it is possible to provide various devices utilizing the temperature measurement device. Further, according to the invention, it is possible to provide a temperature measurement device with high accuracy and a high sensitivity and its method by using a bias voltage supply circuit, which permits a forward voltage to be regulated finely and stably, to apply a finely-regulated bias voltage to the semiconductor diode directly.

Further, as described above, while a conventional thermistor has been extremely difficult to control a B constant corresponding to the temperature sensitivity thereof after once fabricated, a temperature measurement device with a semiconductor diode of the invention and its application device enables a temperature sensitivity for a temperature sensor to be changed widely and finely by applying a forward bias voltage through an operational amplifier circuit to the semiconductor diode, which is a temperature sensor and regulating the forward bias voltage.

Also, not only a direct current voltage but also a rectangular wave voltage may be applied as a forward bias voltage, so that a temperature measurement device with high accuracy can be achieved by applying a rectangular wave voltage and reducing the width of the rectangular wave to reduce the power consumption in the semiconductor diode, and a temperature measurement device with a large SN ratio can be provided by taking out an output voltage in synchronization with this rectangular wave voltage.

Further, while it has been also possible to control a B constant corresponding to a temperature sensitivity after fabrication with a previously invented transistor-thermistor, the transistor-thermistor has three terminals because it is a transistor and it is difficult to flow a large current therethrough due to its collector dissipation. In contrast, a semiconductor diode temperature measurement device of the invention and its application device have obvious advantages that two terminals suffice essentially because of using semiconductor diodes, and that it is possible to make self heat generation extremely small even with a large current flowing therethrough because they have no high resistance portion such as a collector.

Further, according to the invention temperature sensitivities of a plurality of semiconductor diodes, which are temperature sensors, can be set at the same value, and their temperature coefficients become equal even with large changes in ambient temperature, so that the invention is preferable for applications as a temperature sensor with high sensitivity and accuracy to a thermal infrared sensor or clinical thermometer wherein, for example, one of the semiconductor diodes is utilized for measurement of a reference temperature, a thermal infrared image sensor, a flow sensor or gas sensor, a Pirani gage, and the like.

What is claimed is:

1. A temperature measurement device comprising:
   a bias voltage supply circuit for outputting an output voltage between a first and second outputs;
   a semiconductor diode applied at one end with the first output of said bias circuit as a forward bias voltage;
   a first operational amplifier circuit having a first input connected to the other end of said semiconductor diode, a second input supplied with the second output of said bias voltage supply circuit, and an output for temperature measurement,
   wherein said bias voltage supply circuit is serially inserted between said semiconductor diode and said first operational amplifier circuit, thereby said semiconductor diode, said bias voltage supply circuit, and said first operational amplifier circuit are connected in series and adjustment in order to have a desired temperature sensitivity is made possible by: adjusting the output voltage of said bias voltage supply circuit; thereby adjusting the forward bias voltage of said semiconductor diode; and adjusting its potential barrier height.

2. The temperature measurement device according to claim 1, further comprising a synchronous output circuit for taking out the output of said first operational amplifier circuit in synchronization with the applied forward bias voltage, wherein said bias voltage supply circuit outputs a rectangular or generally-rectangular single waveform or a repeated waveforms train.

3. The temperature measurement device according to claim 1, further comprising a second operational amplifier circuit having a first input supplied with a connection voltage between said bias voltage supply circuit and said first operational amplifier circuit, a second input supplied with an output of said first operational amplifier circuit, and an output for temperature measurement.

4. The temperature measurement device according to claim 1, wherein said semiconductor diode is formed in a thin film to have cavities in an upper portion, a lower portion, a lateral portion, or a combination of at least two of them.

5. The temperature measurement device according to claim 1, wherein said semiconductor diode is any of a Schottky junction diode, a p-n junction diode, an n+-n junction diode, a p+-p junction diode, and a heterojunction diode.

6. The temperature measurement device according to claim 1, wherein said semiconductor diode is a p-n junction diode and contains enough impurities to degenerate a p-side and n-side semiconductors thereof, and a tunneling current is negligible compared to a diffusion current while the semiconductor diode is applied with a forward bias voltage.

7. The temperature measurement device according to claim 1, wherein more than one set of said semiconductor diode and said bias voltage supply circuit is formed in a substrate, and outputs of said bias voltage supply circuits are individually adjusted.

8. The temperature measurement device according to claim 7, further comprising an operational circuit in order to obtain a differential output at least between a current flowing through one of the semiconductor diode of individual currents flowing through two or more of said semiconductor diodes formed in a substrate, and a current flowing through the other semiconductor diode.

9. The temperature measurement device according to claim 7, wherein at least one of two or more of said semiconductor diodes formed in a substrate is formed in a thin film having a cavity below, and at least another one formed on the substrate in order to measure a temperature of the substrate.

10. The temperature measurement device according to claim 1, comprising a common constant voltage supply circuit for more than one said bias voltage supply circuit, whereby more than one said semiconductor diode can be applied with a forward bias voltage.

11. The temperature measurement device according to claim 10, wherein at least part of constant voltage power supply circuit of said bias voltage supply circuits and at least one said semiconductor diode are integrated in a substrate.

12. The temperature measurement device according to claim 1, wherein said first operational amplifier circuit is provided in common for more than one said semiconductor diode and said bias circuit, further comprising a scanning circuit which enables outputs from more than one said semiconductor diode and said bias circuit to be sequentially supplied to said single operational amplifier circuit.

13. A thermal infrared image sensor, wherein more than one said semiconductor diode and said bias voltage supply circuit in the temperature measurement device according to claim 1 are arrayed in a matrix, and output signals relating to temperatures according to received infrared radiation from individual said semiconductor diodes are read out.

14. A method of measuring temperature utilizing the temperature dependency of a volt-ampere characteristic of a semiconductor diode having at least one potential barrier for governing a current, comprising:

connecting a bias voltage supply circuit, a semiconductor diode, and an input side of an operational amplifier circuit in series, said bias voltage supply circuit for outputting an output voltage between a first and second outputs, said semiconductor diode supplied at one end with the first output of said bias circuit as a forward bias voltage and said operational amplifier circuit having a first input connected to the other end of said semiconductor diode, a second input supplied with the second output of said bias voltage supply circuit, and an output for temperature measurement;

reducing an output voltage of said bias voltage supply circuit enough to ignore a voltage drop on the way to apply it as a forward bias voltage directly to said semiconductor diode; and making an output of said operational amplifier circuit relate to a forward current flowing through said semiconductor diode, wherein adjustment in order to have a desired temperature sensitivity is made possible by: adjusting the output voltage of said bias voltage supply circuit; thereby changing the forward bias voltage of said semiconductor diode; and adjusting potential barrier height.

15. The method of measuring temperature according to claim 14, wherein;

making an output voltage of said bias voltage supply circuit rectangular or generally-rectangular single waveform or a repeated waveforms train in a predetermined forward bias voltage; and taking out an output from said operational amplifier circuit in synchronization with an applied forward bias voltage.

16. A temperature measurement apparatus comprising:

a variable bias voltage supply circuit;

a semiconductor diode;

an operational amplifier circuit; and a feedback resistor;

wherein a first terminal of said bias voltage supply circuit is coupled to an inverting input of said operational amplifier circuit and to a first terminal of said feedback resistor;

wherein a second terminal of said bias voltage supply circuit is coupled to a first terminal of said semiconductor diode;

wherein a second terminal of said semiconductor diode is coupled to a ground voltage and to a non-inverting input of said operational amplifier circuit;

wherein a second terminal of said feedback resistor is coupled to an output of said operational amplifier circuit; and wherein said semiconductor diode is forward biased by said variable bias voltage supply circuit.

17. A method of measuring temperature, comprising:

applying a forward bias voltage to a first terminal of a semiconductor diode coupled to a first terminal of a variable bias voltage circuit, wherein a second terminal of said variable bias voltage circuit is coupled to an inverting input of a operational amplifier and to first terminal of a feedback resistor, and wherein a second terminal of said semiconductor diode is coupled to a non-inverting input of said operational amplifier and to a ground voltage;

applying a temperature to be measured to said semiconductor diode;

varying said forward bias voltage to adjust a temperature sensitivity of said semiconductor diode; and measuring an output voltage between an output terminal of said operational amplifier and said ground voltage.

* * * * *